United States Patent [19]

Yuge et al.

[11] Patent Number: 4,634,919
[45] Date of Patent: Jan. 6, 1987

[54] BULB

[75] Inventors: Yooji Yuge, Chigasaki; Ariyoshi Ishizaki, Yokohama; Tokuyoshi Saito, Ichihara; Takeshi Ishii, Kamagaya, all of Japan

[73] Assignees: Kabushiki Kaisha Toshiba, Kawasaki; Nippon Soda Co., Ltd., Tokyo, both of Japan

[21] Appl. No.: 641,776

[22] Filed: Aug. 17, 1984

[30] Foreign Application Priority Data

Aug. 22, 1983 [JP] Japan .................. 58-151724

[51] Int. Cl.$^4$ .............................................. F21M 3/14
[52] U.S. Cl. ..................................... 313/113; 313/112
[58] Field of Search ................. 313/112, 113; 427/160, 427/161, 163, 165, 389; 350/1.6, 1.7, 313; 65/3.11

[56] References Cited

U.S. PATENT DOCUMENTS

| | | | |
|---|---|---|---|
| 4,227,113 | 10/1980 | Walsh | 313/112 |
| 4,346,324 | 8/1982 | Yoldas | 313/112 |
| 4,361,598 | 11/1982 | Yoldas | 427/160 |
| 4,425,527 | 1/1984 | Sichel | 313/112 |
| 4,504,109 | 3/1985 | Taga et al. | 350/1.6 |
| 4,524,410 | 6/1985 | Kawakatsu et al. | 313/112 |

FOREIGN PATENT DOCUMENTS 50-73468 10/1974 Japan .
51-66841 6/1976 Japan .
53-146482 12/1978 Japan .

OTHER PUBLICATIONS

H. Schroeder, "Oxide Layers Deposited from Organic Solutions", Phys. of Thin Films, vol. 15, p. 87, 1969.
H. Schroeder, "Properties and Applications of Oxide Layers Deposited on Glass from Organic Solutions", Opt. Acta., vol. 9, p. 249, 1962.

Primary Examiner—David K. Moore
Attorney, Agent, or Firm—Cushman, Darby & Cushman

[57] ABSTRACT

There is proposed a bulb which is coated with an optical interference film consisting of alternately formed thin titanium oxide layers and metal oxide layers of a lower refractive index than that of titanium oxide layers. The characteristics of the bulb reside in the formation of each titanium oxide layer which is formed by thermal decomposition of a mixture consisting of 5 to 50 parts by weight of Ti(OR)$_4$ and 95 to 50 parts by weight of polymerized Ti(OR)$_4$, where R are $C_1$ to $C_{18}$ alkyl group, —OCOR' (R' is $C_1$ to $C_{18}$ alkyl group or —X radical which is capable of forming a chelate ring with titanium.

11 Claims, 2 Drawing Figures

BULB

BACKGROUND OF THE INVENTION (a) Field of the Invention

The present invention relates to a bulb for selectively radiating light of desired wavelength utilizing interference and, more particularly, to a bulb for selectively projecting to the front only visible light among light components radiated from a filament.

(b) Description of the Prior Art

A lamp is conventionally known in which a visible light reflecting/infrared light transmitting layer is formed on a reflecting surface of a reflecting bulb. The visible light reflecting/infrared light transmitting layer consists of a total of seven to nine alternately formed thin titanium oxide layers and thin silica layers having a lower refractive index than that of the thin titanium oxide layers. This lamp reflects toward the front of its reflecting surface visible light from the light radiated from a filament or a light-emitting tube as a light-emitting member. The lamp transmits the infrared light through the reflecting surface toward the back. Therefore, the lamp can project light having a small infrared ray component.

A high-efficiency bulb has also been proposed recently. This bulb has a filament as a light-emitting member arranged at the center of a T-shaped or tubular bulb. A visible light transmitting/infrared light reflecting film is formed on at least one of the inner and outer surfaces of the bulb. The visible light transmitting/infrared light reflecting film also consists of a total of seven to nine thin titanium oxide layers and thin silica layers of a lower refractive index which are formed alternately. Of the light emitted from the filament, the visible light is transmitted through the reflecting film and radiated to the outside. Infrared light is reflected by the reflecting surface and is fed back to the filament, thereby heating the filament. This bulb therefore has a high efficiency and can radiate light having a small infrared component.

Both the visible light reflecting/infrared light transmitting and the visible light transmitting/infrared light reflecting film comprise metal oxide layers of a high refractive index and metal oxide layers of a low refractive index which are formed alternately. Both these films utilize interference to achieve the prescribed effect. Such films have different transmitting or reflecting wavelength regions in accordance with the thickness of each layer.

An optical film having such characteristics will be referred to as an optical interference film herein.

Conventional methods of forming thin titanium oxide layers include a method of directly forming a titanium oxide layer or the like on a bulb surface or a thin silica layer by the vacuum deposition method, the sputtering method, or the CVD method; or a method of coating a solution of an organic titanium compound by the spraying method, the spinner method, the dipped coating method, the brush coating method, or the printing method, and thermally decomposing the coated film into titanium oxide. Among such methods, the coating method is preferred for mass production. The coating method uses as a coating solution an organic solvent solution of a titanium alkoxide having a general formula $Ti(OR)_4$ (where R is an alkyl group), such as tetraisopropoxy titanate or tetrabutoxy titanate. However, titanium alkoxides are easily hydrolyzed upon absorption of water in the air. For this reason, the coating solution easily becomes turbid or highly viscous; it has a poor stability and is hard to handle.

In order to solve this problem, a stable coating solution of a titanium alkoxide has been proposed which uses as a solvent a chelating agent such as acetylacetone or methyl acetoacetate, or an acetec ester of an alcohol. However, with this method, although the humidity resistance of the coating solution is improved, the film formation performance of the thin titanium oxide layer is poor and the obtained film has a small refractive index. Another coating solution has also been proposed which uses an organic solvent solution containing a polymer obtained by polymerizing a water-containing titanium alkoxide. Although this coating solution has a good film formability of a thin titanium layer, it is still subject to turbidity due to the influence of humidity. Japanese Patent Disclosure No. 54-43241 proposes still another coating solution which is obtained by polymerization by adding water to a titanium alkoxide and stabilizing the solution by adding a chelating agent such as acetylacetone. This coating solution has a good stability against high humidity and has a good film formability when only a single thin titanium oxide layer is formed. However, when this coating solution is used to form a multilayered film of thin metal oxide layers of a low refractive index and thin silica layers as in the case of an optimal interference film, it has poor adhesion between the thin titanium oxide layers and the thin metal oxide layers of low refractive index.

When a thin titanium oxide layer is used as an optical interference film, its refractive index greatly affects the optical characteristics of the film. More specifically, an optical interference film generally comprises low refractive index layers and high refractive index layers formed alternately. The optical characteristics of such a film change in accordance with a ratio of the refractive index of the low refractive index layers to that of the high refractive index layers. The higher the ratio, the higher the reflectance and the wider the reflecting wavelength range. For this reason, titanium oxide layers as high refractive index layers preferably have a higher refractive index. However, when conventional organic titanium compounds are used to obtain an optical interference film on a glass bulb having a high refractive index by adjusting the composition and thermal decompositon conditions, the film becomes turbid due to a temperature increase when the lamp is ON. This is caused since the crystal structure of titanium oxide changes from the anatase phase to the rutile phase. The turbidity of a film significantly degrades the quality of the film as an interference film due to light scattering. Upon this phase transformation, cracks are formed in addition to an increase in turbidity and the film is easily separated when the lamp is turned on and off. The temperature at which the film is subjected to this phase transformation is different in accordance with the original material used and is 600° to 700° C. when the above solution is used. Therefore, phase transformation is an important problem in the bulb which is operated at a high temperature.

SUMMARY OF THE INVENTION

It is an object of the present invention to provide a bulb which has an optical interference film which, in turn, has a good film formability and good adhesion with other films, is thin, and has good optical characteristics, a small light loss and high heat resistance.

According to the present invention, there is provided a bulb comprising a glass bulb sealing a light-emitting member therein, and an optical interference film formed on either or both the inner and outer surfaces of said glass bulb and consisting of alternately formed thin titanium oxide layers and thin metal oxide layers of a lower refractive index than that of the above thin titanium oxide layers, wherein the thin titanium oxide layers are formed by coating a mixture and thermally decomposing the coated mixture, the mixture consisting of:

(A) 5 to 50 parts by weight of an organic compound A obtained by substituting some or all of alkoxyl groups of a titanium alkoxide having a general formula:

$$Ti(OR)_4$$

(wherein R are the same or different alkyl groups having 1 to 18 carbon atoms) with one or more substituting groups selected from the group consisting of a residual group, —OCOR' of a carboxylic acid having a general formula:

$$HOCOR'$$

(wherein R' is an alkyl group having 1 to 18 carbon atoms), and a residual group, —X of an organic compound having a formula HX and capable of forming a chelate ring with titanium; and (B) 95 to 50 parts by weight of an organic titanium compound polymer B obtained by substituting some or all of the substituting groups, —OR of a titanium alkoxide polymer obtained by polymerization under water addition of the same or different titanium alkoxides having a general formula:

$$Ti(OR)_4$$

(wherein R are the same or different alkyl groups having 1 to 18 carbon atoms) with one or more substituting groups selected from the group consisting of a residual group, —OCOR' of a carboxylic acid having a general formula:

$$HOCOR'$$

(wherein R' is an alkyl group having 1 to 18 carbon atoms) and a residual group, —X of an organic compound having a formula HX and capable of forming a chelate ring with titanium.

DETAILED DESCRIPTION OF THE PREFERRED EMBODIMENTS

Details of the present invention will be described below with reference to the accompanying drawings.

Figure 1:
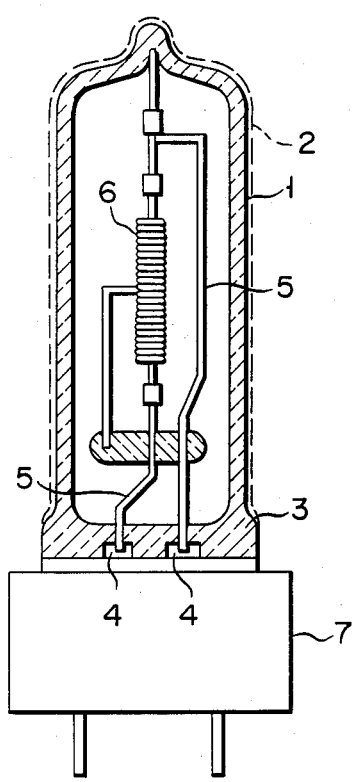
FIG. 1 is a sectional view of a bulb according to an embodiment of the present invention.

FIG. 1 shows an embodiment of a high-efficiency halogen lamp. Referring to FIG. 1, reference numeral 1 denotes a T-shaped bulb of a heat-resistant glass such as quartz glass. A visible light transmitting/infrared light reflecting optical interference film 2 is formed on either (e.g., the outer surface) or both the inner and outer surfaces of the bulb 1. A sealing portion 3 seals the proximal end of the bulb 1. Molybdenum leads 4 are buried in the sealing portion 3. A pair of internal leads 5 are connected to the leads 5 and extend inside the bulb 1. A coil filament 6 as a light-emitting member is suspended between the internal leads 5 and is located at the center of the bulb 1. A required halogen (e.g., chlorine or bromine) is sealed together with an inert gas such as Ar gas inside the bulb 1.

Figure 2:
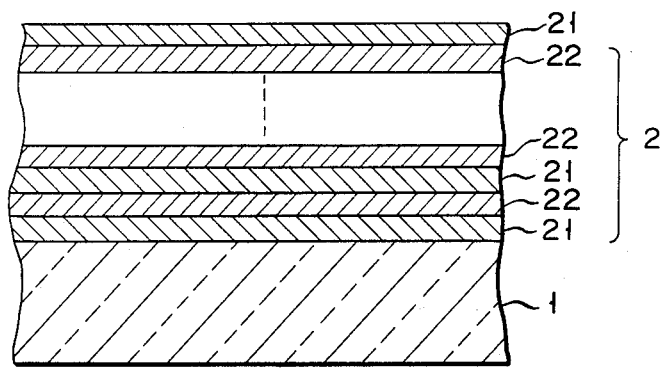
FIG. 2 is an enlarged sectional view of an optical interference film according to the present invention.

As shown enlarged in FIG. 2, the optical interference film 2 has on the glass surface of the bulb 1 thin titanium oxide layers 21 of a high refractive index and thin metal oxide layers of a lower refractive index than that of the layers 21, for example, thin silica layers 22. The layers 21 and 22 total seven to nine and are formed alternately. When the thickness of each layer 21 or 22 is suitably set, the optical inteference film transmits visible light well and reflects infrared light well in accordance with optical interference.

The optical interference film 2 is obtained by alternately forming the thin titanium oxide layers 21 and thin silica layers 22 by the following method.

The thin titanium oxide layers 21 are formed by coating a mixture of an organic titanium compound A and an organic titanium compound polymer B on the surface of the bulb 1 and of the thin silica layer 22, and thermally decomposing the coated mixture. The thickness of the layer 21 is adjusted by controlling the concentration of the mixture and the coating method.

An organic titanium compound A is obtained by substituting some or all of alkoxyl groups of a titanium alkoxide having a general formula $Ti(OR)_4$ such as tetramethoxy titanate, tetraethoxy titanate, tetraisopropoxy titanate, tetrabutoxy titanate, diethoxydiisopropoxy titanate, or by substituting diisopropoxybutoxy titanate with a residual group —OCOR' of a carboxylic acid having a general formula HOCOR' such as acetic acid, propionic acid or butyric acid, and/or a residual group —X of a chelating agent of an organic compound having a general formula HX and capable of forming a chelate ring with titanium, such as a -diketone, e.g., acetylacetone or benzoylacetone; an α- or -ketonic acid, e.g., acetoacetic acid, propionic butyric acid; a lower alkylester, e.g., methyl, ethyl, propyl, or butyl ketonic acids of these types; an oxy acid, e.g., glycolic acid or lactic acid; lower alkyl esters, e.g., methyl, ethyl, propyl or butyl oxy acids of these types; a diol; or an aminoalcohol. Examples of compound A include diisopropoxybis (acetylacetonato) titanate or dibutoxybis (acetylacetonato) titanate. A compound obtained by substituting some or all of the alkoxyl groups of a titanium alkoxide with a residue of a carboxylic acid and/or a residue of a chelating agent can be easily prepared by reacting a titanium alkoxide, a carboxylic acid, and/or a chelating agent under the presence or absence of an organic solvent.

An organic titanium compound polymer B is obtained in the following manner. When water is reacted with the same or different titanium alkoxides having a general formula, $Ti(OR)_4$, polymerization easily occurs to provide a titanium alkoxide polymer having a degree of polymerization n of 2 to 100. This polymer is reacted with a carboxylic acid having a general formula, HOCOR', and/or with a chelating agent having a general formula, HX, capable of forming a chelate ring with titanium. The polymer used as the organic titanium compound polymer B has a degree of polymerization n of 2 to 100 and is preferably 2 to 50.

According to the present invention, an organic solution which contains 20% by weight or less or preferably 10% by weight or less in terms of the $TiO_2$ content and comprises 5 to 50 parts, preferably 5 to 20 parts by weight of the organic compound A, and 95 to 50 parts, preferably 95 to 80 parts by weight of the organic titanium compound polymer B is used. The solution may also contain 0.1 to 10% weight (based on $TiO_2$) of one or more additives such as glass-like forming agents, e.g., organic or inorganic phosphorus compounds, boron compounds, arsenic compounds, antimony compounds, tin compounds, lead compounds, zinc compounds, potassium compounds, nickel nitrate or cobalt nitrate. As an organic solvent, any solvent capable of dissolving both the organic titanium compound A and the organic titanium compound polymer B can be used. However, in view of the volatility of the solvent, stability of the obtained solution, or economy, a lower alcohol, an ester, a ketone, an aliphatic hydrocarbon, and an aromatic carbon having a boiling point of 180° C. or lower, and halogen compounds thereof, are preferably used singly or in an admixture of more than one.

The organic solution containing the mixture of the organic titanium compound A and the organic titanium compound polymer B is coated as a coating solution to a predetermined thickness on the outer surface of the bulb 1 and on the thin silica layer 22 formed on the bulb 1 in a later step. The coated mixture is held at a temperature of 300° C. or higher for three to ten minutes to thermally decompose the mixture. Then, the thin titanium oxide layer 21 which is transparent and has a uniform thickness is formed. The coating method may be any of the conventional methods such as dipped coating method, the spraying method, the spinner method, the printing method, and the brush coating method. However, the dipped coating method is preferably adopted so as to form thin titanium oxide layers 21 of a uniform thickness for the bulb 1. A thin titanium oxide layer 21 can also be formed by spraying the coating solution on a predetermined surface of the bulb 1 and thermally decomposing the coated mixture.

The thin silica layer 22 can be formed by coating an organic solution as a coating solution on the surface of the bulb 1 with the layer 21, drying the coated solution and thermally decomposing it. The organic solution contains an organic silicon compound such as an alkoxysilane, e.g., tetramethoxysilane, tetraethoxysilane, tetraisopropoxysilane, tetrabutoxysilane, diethoxydiisopropoxysilane or dichlorodimethoxysilane, or polymers thereof.

The mixture of the organic titanium compound A and the organic titanium compound polymer B is stable, has a good humidity resistance and film formability, and a good adhesion strength with a thin metal oxide film of a different type, such as silica. In addition, the obtained thin titanium oxide layer 21 is dense, has a good adhesion strength, is transparent, has a high refractive index, and does not cause separation in a multilayered structure with metal oxide layers of a different type. The layer 21 also has a stable crystalline structure up to high temperatures, is not subject to turbidity or cracking, and is suitable for bulbs having a high temperature or subjected to repeated ON-OFF operation.

The method of forming the optical interference film 2 will be described in detail.

EXAMPLE 1

(A) Synthesis of organic titanium compound A 42.6 g of tetraisopropoxy titanate, $Ti(OiPr)_4$, were dissolved in 234 g of ethanol. 30 g of acetyl acetone were added to the mixture to provide an ethanol solution containing 54.6 g of an organic titanium compound in which some —OiPr groups of $Ti(OiPr)_4$ were substituted with an acetyl acetone residue. Note that iPr is an isopropyl group.

(B) Synthesis of organic titanium compound polymer B 56.8 g of tetraisopropoxy titanate, $Ti(OiPr)_4$, were dissolved in 350 g of ethanol. 3.2 g of water were gradually added to the mixture under stirring to perform polymerization. 40 g of acetyl acetone were added to the solution under stirring to provide an ethanol solution containing 60.8 g of the organic titanium compound polymer B having a polymerization degree of 10 (n=10) in which some —OiPr groups were substituted with an acetyl acetone residue.

(C) Preparation of thin titanium oxide layer forming coating solution 30 g of the ethanol solution of the organic titanium compound A and 400 g of the ethanol solution of the organic titanium compound polymer B described above were mixed. 0.4 g of phosphorus pentoxide, $P_2O_5$, as a glass forming material were added. The mixing ratio of the organic titanium compound A and the organic titanium compound polymer B in terms of $TiO_2$ was adjusted to provide a coating solution for forming the thin titanium oxide layers in which the total content of the compound A and the polymer B was 3.6% by weight.

(D) Formation of thin titanium oxide layers 21

A well cleaned sealing bulb was dipped in the prepared coating solution for forming the thin titanium oxide layers and was pulled. The bulb was heated and sintered in an electric furnace at 500° C. to form a thin titanium oxide layer 21 on the outer surface of the bulb 1.

(E) Formation of thin silica layer 22

The bulb having the thin titanium oxide layer 21 thereon was dipped in an organic solution containing 5.0% by weight of an organic silicon compound in terms of $SiO_2$, for example, "Atron RNSi-500" available from Nippon Soda Co., Ltd. (an acetic ester solution mainly consisting of a silicate polymer). The bulb was heated and sintered in an electric furnace at 500° C. for ten minutes to form a thin silica layer 22 on the layer 21. The pulling speed and solution concentration were adjusted such that each obtained film had an optical thickness close to ¼ of an infrared wavelength.

The steps (D) and (E) were repeated a plurality of times to form the optical interference film 2 which transmits visible light and reflects infrared light. The film 2 did not have any pin holes and was not subject to separation.

The mixing ratio of the organic titanium compound A to the organic titanium compound polymer B was varied to form various optical interference films and the optical characteristics of the resultant films were examined by spetrum analysis. The obtained results were as follows.

(1) The refractive index of the titanium oxide film changed in accordance with the content and the type of glass forming material of the organic titanium compound used. When the organic titanium compound A was used in an amount of 5% or less, the refractive index of the resultant film was 2.5 or more at a wavelength of 500 nm. When the organic titanium compound A was used in an amount of 50% or more, the resultant film had a refractive index of 2.0 or less at a wavelength of 1,000 nm. The refractive index slightly fluctuated in accordance with the type and amount of a glass forming material used.

When the lamp was lit, the film had a refractive index of 2.5 or more at a wavelength of 500 nm. With the optical interference film formed with a mixture containing an organic titanium compound A in the amount of 50% or more, the bulb became turbid as its temperature increased. X-ray diffractiometry of the bulb revealed a transformation from the anatase phase to the rutile phase of titanium oxide.

(2) However, with a lamp of the example (lamp having an optical interference film with thin titanium oxide films formed of a mixture containing five to 50 parts by weight of the organic titanium compound A and 95 to 50 parts by weight of the organic titanium polymer B), the X-ray diffractiometry revealed that the bulb mainly consisted of an amorphous structure. Even after the lamp was turned on, the bulb mainly consisted of the amorphous structure, and a small amount of anatase phase did not transform into the rutile phase. An optical interference film having a refractive index of 2.0 or less at a wavelength of 1,000 nm had poor optical characteristics and did not significantly improve efficiency. When the lamp having the optical interference film was repeatedly turned on and off, the film was separated. An optical interference film 2 having a titanium oxide film having a refractive index of 2.5 or less at a wavelength of 500 nm and a refractive index of 2.0 or more, preferably 2.1 or more at a wavelength of 1,000 nm was uniform in quality and had good optical characteristics. When the film was used for a long period of time, turbidity or separation did not occur. Since this film experiences only a small change in the refractive index with changes in wavelength, the optical interference film has a small change in transmittance of visible light and the light will not be colored.

A visible light transmitting/infrared light reflecting film was formed by using a mixture consisting of five to 50 parts by weight of the organic titanium compound A and 95 to 50 parts by weight of the organic titanium polymer B and by adjusting the time for sintering to become short and the sintering temperature to range from 500° C. to 700° C., so that the resultant titanium oxide film had a refractive index of 2.5 or less at a wavelength of 500 nm and a refractive index of 2.0 or more at a wavelength of 1,000 nm. The infrared rays radiated by the filament were reflected by the reflecting film and became incident on the filament, thereby providing a lamp with an improved efficiency.

EXAMPLES 2–4

The organic titanium compound A and the organic titanium polymer B, both obtained in the same manner as in Example 1 were mixed together at conditions as shown in the following Table 1 and sintered in the same conditions as in Example 1 after being coated onto a bulb to form an interference film. Results are shown in Table 1.

TABLE 1

| | Organic Titanium Compound | | | | | Refractive Index | | Characteristics of interference film |
|---|---|---|---|---|---|---|---|---|
| | A | | B | | A/B | | | |
| | Ti(OR)$_4$ | HOCOR', HX | Ti(OR)$_4$ Polymer | HOCOR', HX | Weight | 500 nm | 1000 nm | |
| 1 | Ti(OiPr)$_4$ | AA AA/Ti = 2 mol ratio | Ti(OiPr)$_4$ n = 10.5 | AA AA/Ti = 2 mol ratio | 5/95 | 2.22 | 2.05 | good |
| 2 | Ti(OiPr)$_4$ | AA AA/Ti = 2 mol ratio | Ti(OiPr)$_4$ n = 10.5 | AA AA/Ti = 2 mol ratio | 10/90 | 2.26 | 2.17 | good |
| 3 | Ti(OiPr)$_4$ | AA AA/Ti = 2 mol ratio | Ti(OiPr)$_4$ n = 10.5 | AA AA/Ti = 2 mol ratio | 30/70 | 2.25 | 2.18 | good |
| 4 | Ti(OnBu)$_4$ | AA AA/Ti = 2 mol ratio | Ti(OnBu)$_4$ n = 10 | AA AA/Ti = 2 mol ratio | 10/90 | 2.28 | 2.15 | good |
| 5 | Ti(OnBu)$_4$ | AA AA/Ti = 2 mol ratio | Ti(OnBu)$_4$ n = 10 | LA LA/Ti = 2 mol ratio | 20/80 | 2.22 | 2.11 | good |
| 6 | Ti(OiPr)$_4$ | EAA EAA = 2 mol Ti ratio | Ti(OiPr)$_4$ n = 15 | EAA EAA = 2 mol Ti ratio | 10/90 | 2.25 | 2.14 | good | iPr; isopropyl group
AA; acetylacetone
nBu; normal butyl group
EAA; ethyl acetoacetate
LA; lactic acid The examples were described with reference to a small halogen lamp having a single filament. However, the present invention can be applied to a lamp wherein a plurality of filaments is arranged separate from each other in a straight tube-type heat-resistant glass bulb. Visible light transmitting/infrared light reflecting films as described above can be formed on both the inner and outer surfaces of the bulb. Furthermore, such an optical interference film can be formed on at least one of the inner and outer surfaces of a normal lamp bulb.

According to the present invention, it is also possible to form a visible light transmitting/infrared light reflecting film on the outer surface of an end of a light-emitting tube of a metal halide lamp and to heat the electrode portions.

In a reflecting lamp such as a reflecting high-voltage discharge lamp, if a visible light reflecting/infrared light transmitting optical interference film is formed on the reflecting surface of the bulb, the visible light can be reflected to the front by the optical interference film and the infrared light can be radiated backward, so that light free from infrared light components can be projected.

In the above embodiments, only a thin silicon oxide film is explained as a metal oxide having a lower refractive index than the titanium oxide film. However, magnesium oxide, aluminum oxide and the like can also be employed in place of silicon oxide.

A bulb according to the present invention has a thin titanium oxide film as a part of an optical interference film which has a good film formability, a good adhesion strength with a metal oxide layer of a different type of metal, is uniform in composition and thickness, is transparent, and which has a high refractive index. Therefore, the optical interference film having the thin titanium oxide layer has constant optical characteristics, is free of local irregularities, has a small light loss, and will not cause film separation after repeated ON/OFF operations of the lamp.

The organic titanium compound A and the organic titanium compound polymer B are stable and have good humidity resistance, so that they facilitate storage and handling, and facilitate mass production of bulbs.

What is claimed is:

1. A bulb comprising a glass bulb sealing a light-emitting member therein, and an optical interference film formed on at least one of inner and outer surfaces of said glass bulb and consisting of alternately formed thin titanium oxide layers and thin metal oxide layers of a lower refractive index than that of the thin titanium oxide layers, wherein the thin titanium oxide layers are formed by coating a mixture and thermally decomposing the coated mixture, the mixture consisting of:

(A) 5 to 50 parts by weight of an organic compound A obtained by substituting some or all of alkoxyl groups of a titanium alkoxide having a general formula:

$Ti(OR)_4$ (wherein R are the same or different alkyl groups having 1 to 18 carbon atoms) with one or more substituting groups selected from the group consisting of a residual group, —OCOR' of a carboxylic acid having a general formula:

$HOCOR'$ (wherein R' is an alkyl group having 1 to 18 carbon atoms), and a residual group: —X of an organic compound having a formula HX and capable of forming a chelate ring with titanium; and (B) 95 to 50 parts by weight of an organic titanium compound polymer B obtained by substituting some or all of substituting groups, —OR of a titanium alkoxide polymer obtained by polymerization under water addition of the same or different titanium alkoxides having a general formula:

$Ti(OR)_4$ (wherein R are the same or different alkyl groups having 1 to 18 carbon atoms) with one or more substituting groups selected from the group consisting of a residual group, —OCOR' of a carboxylic acid having a general formula:

$HOCOR'$ (wherein R' is an alkyl group having 1 to 18 carbon atoms) and a residual group, —X of an organic compound having a formula HX and capable of forming a chelate ring with titanium.

2. A bulb according to claim 1, wherein the thin titanium oxide layers have a refractive index of not more than 2.5 at a wavelength of 500 nm and a refractive index of not less than 2.0 at a wavelength of 1,000 nm.

3. A bulb according to claim 1, wherein the organic titanium compound A is added in an amount of 5 to 20 parts by weight and the organic titanium compound polymer B is added in an amount of 95 to 80 parts by weight.

4. A bulb according to claim 1, wherein the thin metal oxide layers consist of silica.

5. A bulb according to claim 1, wherein the residue —X is a residue of a chelating agent such as a $\beta$-diketone, e.g., acetylacetone or benzoylacetone; an $\alpha$- or $\beta$-ketonic acid, e.g., acetoacetic acid, propionic butyric acid; a lower alkyl ester, e.g., methyl, ethyl, propyl, or butyl ketonic acids of these types; an oxy acid, e.g., glycolic acid or lactic acid; lower alkyl esters such as methyl, ethyl, propyl or butyl oxy acids of these types; or a diol or an aminoalcohol.

6. A bulb according to claim 1, wherein the residue —OCOR' is one member selected from the group consisting of residues of acetic acid, propionic acid, and butyric acid.

7. A bulb according to claim 1, wherein the organic titanium compound polymer B has a degree of polymerization n of 2 to 100.

8. A bulb according to claim 1, wherein the thin titanium oxide layers mainly consist of an amorphous structure.

9. A bulb according to claim 1, wherein the mixture of the organic titanium compound A and the organic titanium compound polymer B contains at least one glass forming agent selected from the group consisting of a phosphorus compound, a boron compound, an arsenic compound, and an antimony compound.

10. A bulb according to claim 9, wherein the glass forming agent is contained in an amount of 0.1 to 10% by weight based on the mixture.

11. A bulb according to claim 1, wherein said bulb is a halogen lamp.

* * * * *